United States Patent
Sato et al.

(10) Patent No.: US 12,036,993 B2
(45) Date of Patent: Jul. 16, 2024

(54) CONTROL DEVICE FOR VEHICLES

(71) Applicant: Hitachi Automotive Systems, Ltd., Hitachinaka (JP)

(72) Inventors: Yasuaki Sato, Hitachinaka (JP); Hiroyuki Ooiwa, Hitachinaka (JP); Hideki Sekiguchi, Hitachinaka (JP); Hiroyuki Sakamoto, Hitachinaka (JP); Shogo Miyamoto, Hitachinaka (JP)

(73) Assignee: Hitachi Astemo, Ltd., Hitachinaka (JP)

( * ) Notice: Subject to any disclaimer, the term of this patent is extended or adjusted under 35 U.S.C. 154(b) by 734 days.

(21) Appl. No.: 17/055,490

(22) PCT Filed: Jun. 19, 2019

(86) PCT No.: PCT/JP2019/024209
§ 371 (c)(1),
(2) Date: Nov. 13, 2020

(87) PCT Pub. No.: WO2020/008873
PCT Pub. Date: Jan. 9, 2020

(65) Prior Publication Data
US 2021/0221379 A1  Jul. 22, 2021

(30) Foreign Application Priority Data
Jul. 6, 2018  (JP) .................................. 2018-129485

(51) Int. Cl.
*B60W 30/19* (2012.01)
*B60W 30/18* (2012.01)

(52) U.S. Cl.
CPC ...... *B60W 30/19* (2013.01); *B60W 30/18009* (2013.01); *B60W 2510/1005* (2013.01); *B60W 2554/4045* (2020.02)

(58) Field of Classification Search
CPC .......... B60W 30/19; B60W 30/18009; B60W 2554/4045; B60W 2510/1005
See application file for complete search history.

(56) References Cited

U.S. PATENT DOCUMENTS

| 4,788,892 A | 12/1988 | Komoda |
| 2012/0252612 A1* | 10/2012 | Kodama ........... F16H 61/66272 474/69 |
| 2017/0015321 A1 | 1/2017 | Nakadori |

FOREIGN PATENT DOCUMENTS

| JP | S61-262259 A | 11/1986 |
| JP | 2001-235016 A | 8/2001 |

(Continued)

OTHER PUBLICATIONS

International Search Report with English translation and Written Opinion issued in corresponding application No. PCT/JP2019/024209 dated Aug. 27, 2019.

*Primary Examiner* — Gertrude Arthur Jeanglaude
(74) *Attorney, Agent, or Firm* — Foley & Lardner LLP

(57) ABSTRACT

There is provided a control device for vehicles which can improve quietness and fuel economy, while maintaining high responsiveness to acceleration of a vehicle. Therefore, the control device 100 for vehicles includes a gear ratio control unit 10 that controls a gear ratio of a vehicle V, and a determination unit 20 that determines whether or not there is an acceleration limit of the vehicle V. The gear ratio control unit 10 is configured to limit an increase in gear ratio $R_t$, when the determination unit 20 determines that there is an acceleration limit.

14 Claims, 4 Drawing Sheets

(56) References Cited

FOREIGN PATENT DOCUMENTS

| JP | 2001-271922 A | 10/2001 |
|----|---------------|---------|
| JP | 2008-110695 A | 5/2008 |
| JP | 2017-024479 A | 2/2017 |
| JP | 2018-005827 A | 1/2018 |

* cited by examiner

CONTROL DEVICE FOR VEHICLES

TECHNICAL FIELD

This disclosure relates to a control device for vehicles.

BACKGROUND ART

In the related art, the invention relating to a driving force control device of an automobile is known (see PTL 1 below). The driving force control device of an automobile described in PTL 1 includes a means for detecting a gear ratio of a transmission, a current acceleration/deceleration will detecting means, a target driving force setting means, an operating point determining means, a target engine torque determining means, an engine torque manipulating means, and a gear ratio manipulating means (see Claim 1 or the like in the PTL 1).

The means for detecting a gear ratio of a transmission detects a gear ratio of a multi-speed or non-stage transmission provided between an engine and a drive wheel. The current acceleration/deceleration will detecting means detects current acceleration/deceleration will of a driver. The target driving force setting means sets a target driving force of a vehicle, based on detected current acceleration/deceleration will and a state of a vehicle. The operating point determining means determines an operating point by selecting a target gear ratio based on a predetermined operating line from a combination of an engine rotational speed and engine torque which realize a target driving force.

The target engine torque determining means determines target engine torque as a value obtained by dividing the target driving force by an actual gear ratio. The engine torque manipulating means manipulates engine torque based on the target engine torque. The gear ratio manipulating means manipulates the gear ratio of the transmission based on the target gear ratio.

In addition to the configuration described above, the drive force control device in the related art is characterized by further including a future acceleration/deceleration will predicting means and a pre-shifting means. The future acceleration/deceleration will predicting means predicts future acceleration/deceleration will. When the future acceleration/deceleration will predicting means determines that there is a high possibility that a driver will accelerate or decelerate in the near future, compared to when determining that there is a low possibility that the driver will accelerate or decelerate, the pre-shifting means selects an operating line passing by an Lo side of a gear ratio to cause a gear ratio of a transmission to shift toward the Lo side, while a target driving force is maintained as is.

According to the configuration, when the future acceleration/deceleration will predicting means determines that there is a low possibility that an acceleration/deceleration request will be made, the future acceleration/deceleration will predicting means performs driving of a Hi-side gear ratio driving point focusing on fuel economy. In addition, when determining that there is a high possibility that an acceleration/deceleration request will be made, the future acceleration/deceleration will predicting means performs driving of a Lo-side gear ratio driving point focusing on response. Therefore, both the fuel economy and response to acceleration/deceleration can be achieved. In addition, since switching between the Hi-side gear ratio driving point and the Lo-side gear ratio driving point is performed on a constant driving force line, a problem of drivability does not arise even when a driver does not perform acceleration/deceleration as predicted. Therefore, it is possible to perform the switching ten minutes before the driver manipulates the accelerator (see paragraph [0015] or the like in the PTL 1).

CITATION LIST

Patent Literature

PTL 1: JP 2001-235016 A

SUMMARY OF INVENTION

Technical Problem

In the driving force control device in the related art, for example, the future acceleration/deceleration will predicting means predicts future acceleration/deceleration will of the driver based on an absolute value of a relative distance to the vehicle ahead or a change rate thereof, manipulation of a turn signal lever, a change rate of an accelerator pedal force, or the like (see Claims 6 to 8 or the like in the PTL 1). Besides, when the future acceleration/deceleration will predicting means determines that there is a high possibility that acceleration will be performed, driving of the Lo-side gear ratio driving point focusing on response is performed.

However, even when the future acceleration/deceleration will predicting means determines that there is a high possibility that the acceleration will be performed, for example, the acceleration of the corresponding vehicle is limited in some cases such as when the following vehicle approaches to overtake the corresponding vehicle from behind the corresponding vehicle, or the like. In this case, driving of the Lo-side gear ratio driving point is performed at a state where the acceleration is limited, and therefore there is concern about an increase in noise and deterioration of the fuel economy due to an increase in rotational speed of an engine.

This disclosure provides a control device for vehicles which can improve quietness and fuel economy, while maintaining high responsiveness to acceleration of a vehicle.

Solution to Problem

According to an aspect of this disclosure, there is provided a control device for vehicles which is mounted on a vehicle, the control device including: a gear ratio control unit that controls a gear ratio of the vehicle; and a determination unit that determines whether or not there is an acceleration limit of the vehicle. The gear ratio control unit limits an increase in the gear ratio, when the determination unit determines that there is an acceleration limit.

Advantageous Effects of Invention

According to the aspect of this disclosure, it is possible to provide a control device for vehicles, the control device being capable of limiting an increase in gear ratio based on determination performed by the determination unit and improving quietness and fuel economy, while the gear ratio control unit controls a gear ratio such that high responsiveness to acceleration of a vehicle is maintained.

DESCRIPTION OF EMBODIMENTS

Figure 1:
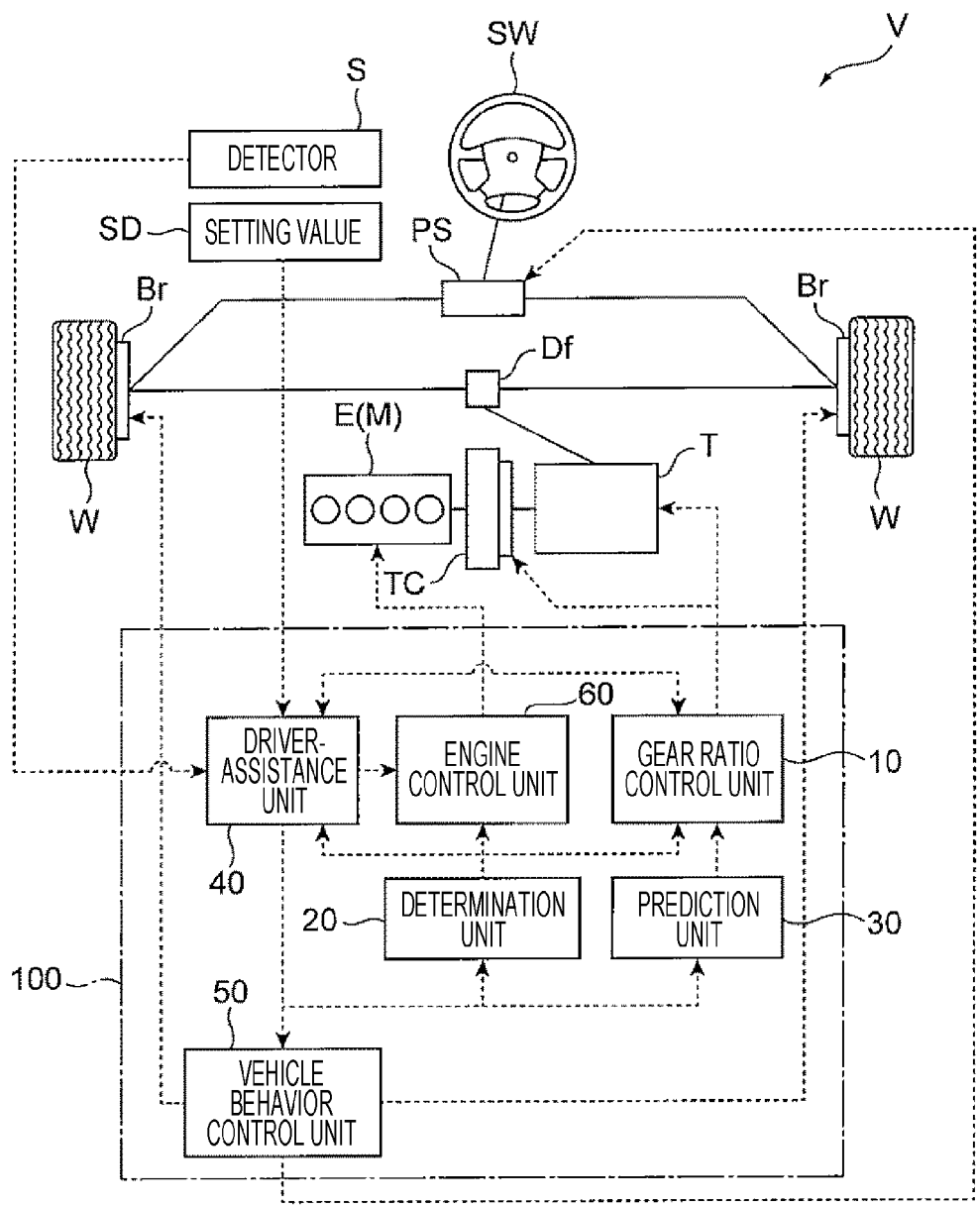
FIG. 1 is a block diagram illustrating a schematic configuration of a control device for vehicles according to an embodiment of this disclosure.

Hereinafter, an embodiment of a control device for vehicles according to this disclosure will be described with reference to the drawings. FIG. 1 is a block diagram illustrating a schematic configuration of a control device 100 for vehicles according to an embodiment of this disclosure.

The control device 100 for vehicles according to the embodiment is a device that is mounted on a vehicle V and is mainly characterized by having the following configuration. The control device 100 for vehicles includes a gear ratio control unit 10 that controls a gear ratio $R_t$ (refer to FIG. 4) of a vehicle V and a determination unit 20 that determines whether or not there is an acceleration limit of the vehicle V. The gear ratio control unit 10 is configured to limit an increase in gear ratio $R_t$, when the determination unit 20 determines that there is an acceleration limit. Hereinafter, an example of a configuration of the vehicle V, on which the control device 100 for vehicles is mounted, will be first described. Next, configurations of units of the control device 100 for vehicles will be described in detail.

For example, the vehicle V includes an engine E or a motor M, a torque converter TC, a differential device Df, a shifter T, a tire W, a brake Br, a steering wheel SW, a power steering device PS, a detector S, and a setting value storage SD. The engine E or the motor M generates torque at an output shaft. The torque converter TC transmits the torque of the output shaft of the engine E or the motor M to the shifter T. Incidentally, instead of the torque converter TC, the vehicle V may include a clutch configured of a friction engagement element.

The shifter T is configured to be capable of changing the gear ratio $R_t$ of the vehicle V. Here, the gear ratio $R_t$ of the vehicle V is a ratio of a rotational speed on the input side of the engine E or the motor M which is a power generator of the vehicle V to the rotational speed on the output side at which the tire W is rotated. That is, when the rotational speed on the output side is constant, an increase in gear ratio $R_t$ of the vehicle V means a shift toward a side of Lo on which the rotational speed on the input side increases, and a decrease in gear ratio $R_t$ of the vehicle V means a shift toward a side of Hi on which the rotational speed on the input side decreases. The shifter T decelerates or accelerates rotation of the engine E or the motor M which is transmitted via the torque converter TC, depending the gear ratio $R_t$, and transmits the decelerated or accelerated rotation to the differential device Df.

For example, the shifter T is a stepped transmission having a gear. For example, the stepped transmission is an automatic transmission (AT) that can select any speed stage among multiple speed stages configured of a friction engagement element such as a planetary gear mechanism, a clutch, or a brake. That is, the gear ratio control unit 10 of the control device 100 for vehicles can be configured to control the gear ratio $R_t$ of the vehicle V via the shifter T which is the AT, for example.

In addition, the shifter T is a non-stage transmission having a belt, for example. For example, the non-stage transmission is a belt-pulley-based continuously variable transmission (CVT) a configured of friction engagement element such as a planetary gear mechanism, a clutch, or a brake. The belt-pulley-based CVT can select any gear ratio $R_t$ among countless gear ratios produced with a pulley ratio of an input shaft pulley and an output shaft pulley, and a speed change mechanism is actuated by a hydraulic mechanism or an electric actuator mechanism. That is, the gear ratio control unit 10 of the control device 100 for vehicles can be configured to control the gear ratio $R_t$ of the vehicle V via the shifter T which is the CVT, for example.

In addition, the shifter T may be a motor. In this case, the shifter T can be configured to transmit torque or the rotational speed of the engine E or the motor M, which is a power source, to the tire W. That is, the gear ratio control unit 10 of the control device 100 for vehicles can be configured to control the gear ratio $R_t$ of the vehicle V via the shifter T which is the motor, for example.

The differential device Df is configured to transmit torque transmitted from the shifter T, to the tire W. For example, the power steering device PS is configured of a motor or a gear and is configured to assist manipulation of the steering wheel SW performed by a driver of the vehicle V or to automatically perform manipulation of the vehicle V under control of a vehicle behavior control unit 50.

For example, the detector S is a device for detecting a surrounding environment of the vehicle V or information of the vehicle V and another vehicle. Here, the surrounding environment of the vehicle V includes the other vehicle around the vehicle V, a pedestrian, an obstacle, a road shape, a white line, or an object which influences running of the vehicle V and information thereof, for example. In addition, examples of information of the vehicle V and the other vehicle include a lane on which the vehicle V and the other vehicle run, a speed of the vehicle V, a steering angle, an inter-vehicular distance between the vehicle V and the other vehicle, and a direction, a location, a speed, a traveling direction, and the like of the other vehicle. Examples of the detector S include a stereo camera, a monocular camera, a radar, a LIDAR, a navigation system and a communication device, a vehicle speed sensor, a steering angle sensor, an accelerator position sensor, a brake pedal force sensor, and various types of sensors such as a sensor that detects manipulation of a turn signal.

The setting value storage SD stores information of a setting speed $v_{set}$ and a setting distance $d_{set}$ which are setting values of a speed and an inter-vehicular distance set by the drive of the vehicle V, whether or not there is adaptive cruise control (ACC), a total length L of the vehicle V, a total length $L_{fv}$ of the other vehicle, or the like. The setting value storage SD supplies stored information to a driver-assistance unit 40. For example, the setting value storage SD is configured to have an input device that inputs a setting value, a storage device that stores the input setting value, a control device that controls the devices, and the like.

Next, the configurations of the units of the control device 100 for vehicles of the present embodiment which is mounted on the above-described vehicle V will be described in detail. For example, the control device 100 for vehicles of the present embodiment includes the gear ratio control unit 10, the determination unit 20, a prediction unit 30, the driver-assistance unit 40, the vehicle behavior control unit 50, and an engine control unit 60. For example, the units of the control device 100 for vehicles can be configured as a part of an electronic control unit (ECU) of the vehicle V.

As described above, the gear ratio control unit 10 controls the gear ratio $R_t$ of the vehicle V. More specifically, the driver-assistance unit 40 determines a target gear ratio Ret, based on a speed v of the vehicle V, a rotational speed $N_e$ of the engine E, and a gear ratio map corresponding to virtual accelerator pedal opening, for example. The gear ratio control unit 10 controls the gear ratio $R_t$ of the vehicle V via the shifter T, based on the target gear ratio $R_t$t determined by the driver-assistance unit 40.

For example, the gear ratio control unit 10 is configured to limit an increase in gear ratio $R_t$ of the vehicle V, when the determination unit 20 determines that there is an acceleration limit. In addition, the gear ratio control unit 10 is configured to increase the gear ratio $R_t$ of the vehicle V, when the prediction unit 30 predicts acceleration of the vehicle V, and the determination unit 20 determines that there is no acceleration limit.

The determination unit 20 is configured to determine whether or not there is an acceleration limit of the vehicle V. Here, whether or not there is an acceleration limit of the vehicle V means whether or not there is a condition that acceleration of the vehicle V is limited. For example, the determination unit 20 acquires information of the other vehicle around the vehicle V from the detector S of the vehicle V and determines whether or not there is an acceleration limit of the vehicle V. Examples of the information that the determination unit 20 acquires from the detector S include information of a lane on which the other vehicle runs and information of a speed, an inter-vehicular distance, a traveling direction, and the like of the other vehicle.

More specifically, in the control device 100 for vehicles, the determination unit 20 can be configured to determine that there is an acceleration limit, when an inter-vehicular distance $d_{fv}$ between the vehicle V and the following vehicle that runs behind the vehicle V is equal to or shorter than a preset setting distance, for example. This is because it is necessary to limit acceleration of the vehicle V and a lane change to an overtaking lane and to avoid abnormal approach or a risk of collision between the following vehicle and the vehicle V, until the following vehicle overtakes the vehicle V, or the inter-vehicular distance $d_{fv}$ between the following vehicle and the vehicle V is longer than the setting distance.

To be more particular, the determination unit 20 can be configured to determine that there is an acceleration limit, when an inter-vehicular distance $d_{fv}$ between the vehicle V and a following vehicle that runs on a second lane adjacent to a first lane and runs behind the vehicle V which runs on the first lane is equal to or shorter than the preset setting distance, for example. The first lane is a running lane, for example, and the second lane is an overtaking lane, for example.

In addition, in the control device 100 for vehicles, the determination unit 20 may be configured to determine that there is an acceleration limit, when a relative speed between the vehicle V and the following vehicle that runs behind the vehicle V is equal to or higher than a preset setting speed, for example. This is also because it is necessary to limit the acceleration of the vehicle V and the lane change to the overtaking lane and to avoid abnormal approach or a risk of collision between the following vehicle and the vehicle V, until the following vehicle overtakes the vehicle V, or the relative speed between the following vehicle and the vehicle V is lower than the setting speed.

To be more particular, the determination unit 20 can be configured to determine that there is an acceleration limit, when the relative speed between the vehicle V and a following vehicle that runs on the second lane and behind the vehicle V which runs on the first lane is equal to or higher than the preset setting speed, for example. The first lane is a running lane, for example, and the second lane is an overtaking lane, for example.

In addition, in the control device 100 for vehicles, the determination unit 20 may be configured to switch the determination that there is an acceleration limit to determination that there is no acceleration limit, based on a time for the following vehicle to overtake the vehicle V. In addition, in the control device 100 for vehicles, the determination unit 20 may be configured to switch the determination that there is an acceleration limit to the determination that there is no acceleration limit, after a time point when the following vehicle overtakes the vehicle V.

The prediction unit 30 is configured to predict acceleration of the vehicle V. For example, the prediction unit 30 acquires information of the other vehicle around the vehicle V and information of the vehicle V from the detector S of the vehicle V and predicts acceleration of the vehicle V. Examples of the information that the prediction unit 30 acquires from the detector S include information of manipulation of a turn signal of the vehicle V, information of a lane on which the vehicle V runs, and information of a speed of a preceding vehicle which runs ahead of the vehicle V, an inter-vehicular distance $d_{fv}$ between the preceding vehicle and the vehicle V, the setting speed $v_{set}$ and the preset setting distance $d_{set}$ set in advance by the driver of the vehicle V.

More specifically, in the control device 100 for vehicles, the prediction unit 30 can be configured to predict the acceleration of the vehicle V, when predicting a lane change of the vehicle V. To be more particular, the prediction unit 30 predicts the lane change of the vehicle V, by recognizing that the vehicle V runs on the first lane, that the second lane adjacent to the first lane is present, and that the turn signal of the vehicle V is manipulated, based on the information acquired from the detector S, for example. Incidentally, when the vehicle V runs on a road with two or more lanes on each side, the first lane is a running lane, for example, and the second lane is an overtaking lane, for example. However, when the vehicle V runs on a road with one lane on each side, the first lane is the lane on which the vehicle V runs, and the second lane is an oncoming lane adjacent to the first lane.

In addition, in the control device 100 for vehicles, the prediction unit 30 may be configured to predict the lane change of the vehicle V, when the inter-vehicular distance $d_{fv}$ between the vehicle V and the preceding vehicle which runs ahead of the vehicle V is equal to or shorter than the preset setting distance $d_{set}$. To be more particular, the prediction unit 30 recognizes that the vehicle V and the preceding vehicle run on the same first lane, that the second lane adjacent to the first lane is present, and the inter-vehicular distance $d_{fv}$ between the preceding vehicle and the vehicle V, based on the information acquired from the detector S, for example. In addition, the prediction unit 30 acquires, from the setting value storage SD, the setting distance $d_{set}$ of the inter-vehicular distance which is set in advance by the driver of the vehicle V and stored in the setting value storage SD. Besides, the prediction unit 30 compares the inter-vehicular distance $d_{1v}$ between the preceding vehicle and the vehicle V which is acquired from the detector S and the setting distance $d_{set}$ acquired from the setting value storage SD, and the prediction unit 30 predicts the lane change of the vehicle V, when the inter-vehicular distance $d_{fv}$ is equal to or shorter than the setting distance $d_{set}$.

In addition, in the control device 100 for vehicles, the prediction unit 30 may be configured to predict the lane change, when the speed v of the vehicle V is equal to or lower than the preset setting speed $v_{set}$. To be more particular, the prediction unit 30 acquires the speed of the vehicle V, based on information acquired from the detector S, for example. In addition, the prediction unit 30 acquires, from the setting value storage SD, the setting speed $v_{set}$ of the vehicle V which is set in advance by the driver of the vehicle V and stored in the setting value storage SD. Besides, the prediction unit 30 compares the speed v of the vehicle V acquired from the detector S and the setting speed $v_{set}$ acquired from the setting value storage SD and predicts the acceleration and the lane change of the vehicle V, when the speed v of the vehicle V is equal to or lower than the setting speed $v_{set}$.

Figure 2:
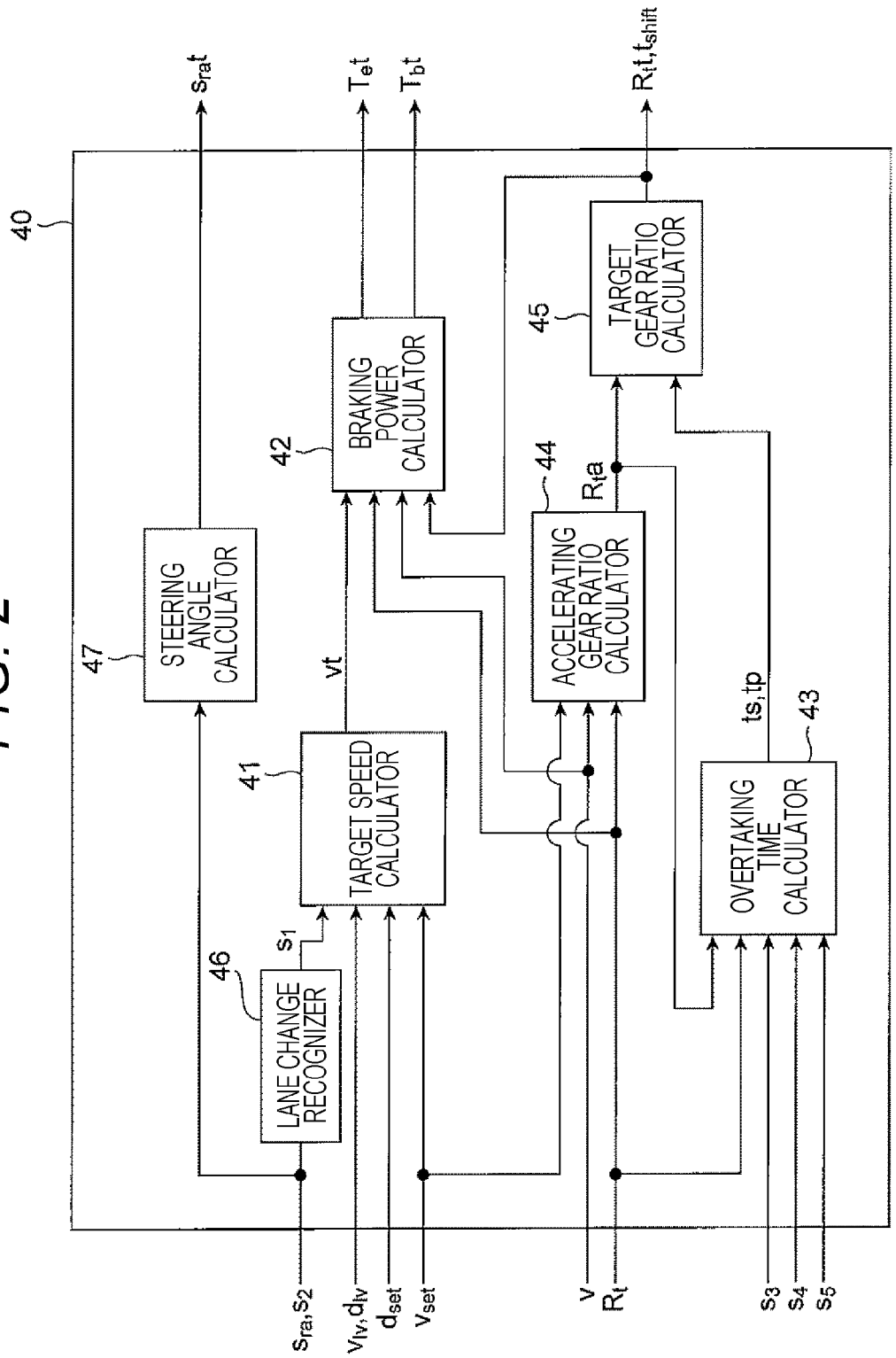
FIG. 2 is a block diagram illustrating an example of a configuration of a driver-assistance unit of the control device for vehicles illustrated in FIG. 1.

FIG. 2 is a block diagram illustrating an example of a configuration of the driver-assistance unit 40 illustrated in FIG. 1. For example, the driver-assistance unit 40 is configured to have a target speed calculator 41, a braking power calculator, 42, an overtaking time calculator 43, an accelerating gear ratio calculator 44, a target gear ratio calculator 45, a lane change recognizer 46, and a steering angle calculator 47, and is configured to perform the ACC to cause the vehicle V to follow the preceding vehicle, while maintaining the preset inter-vehicular distance.

For example, the setting speed $v_{set}$ of the vehicle V set by the driver of the vehicle V and the setting distance $d_{set}$ between the vehicle V and the preceding vehicle are input to the target speed calculator 41 from the setting value storage SD. In addition, the speed $v_{lv}$ of the preceding vehicle which runs ahead of the vehicle V and the inter-vehicular distance $d_{lv}$ between the preceding vehicle and the vehicle V are input to the target speed calculator 41 from the detector S, for example. In addition, a signal $s_1$ indicating whether or not the vehicle V is in the middle of performing the lane change is input to the target speed calculator 41 from the lane change recognizer 46, for example. The target speed calculator 41 calculates a target speed vt of the vehicle V based on the input information and outputs the target speed to the braking power calculator 42.

For example, a steering angle signal $s_{ra}$ indicating a steering angle of the vehicle V and a signal $s_2$ indicating a lane on which the vehicle V runs are input to the lane change recognizer 46 from the detector S. The lane change recognizer 46 determines whether or not the vehicle V is in the middle of performing the lane change based on the input information and outputs the signal $s_1$ indicating the determination result to the target speed calculator 41.

For example, to the braking power calculator 42, the target speed vt of the vehicle V is input from the target speed calculator 41, the speed v of the vehicle V is input from the detector S, the gear ratio $R_t$ of the vehicle V is input from the gear ratio control unit 10, and the target gear ratio $R_t t$ is input from the target gear ratio calculator 45. The braking power calculator 42 calculates target engine torque $T_e t$ and target braking torque $T_b t$ based on the input information, outputs the target engine torque $T_e t$ to the engine control unit 60, and outputs the target braking torque $T_b t$ to the gear ratio control unit 10 and the vehicle behavior control unit 50. Incidentally, the braking power calculator 42 may acquire the rotational speed of the engine E or the motor M and the speed v of the vehicle V from the detector S and may calculate the gear ratio $R_t$ based on information thereof, for example.

For example, to the overtaking time calculator 43, a signal $s_3$ including information of lanes on which the vehicle V and the following vehicle run, a signal $s_4$ including information of the speed $v_{fv}$ of the following vehicle and the inter-vehicular distance $d_{fv}$ between the vehicle V and the following vehicle, and a signal $s_5$ including manipulation information of the turn signal are input from the detector S. In addition, to the overtaking time calculator 43, the gear ratio $R_t$ of the vehicle V is input from the gear ratio control unit 10, and an accelerating gear ratio $R_t a$ is input from the accelerating gear ratio calculator 44. The overtaking time calculator 43 calculates an overtaking time tp for the following vehicle to overtake the vehicle V and a shift start timing ts based on the input information and outputs the overtaking time and the shift start timing to the target gear ratio calculator 45.

More specifically, the overtaking time calculator 43 calculates a relative speed and a relative distance between the vehicle V and the following vehicle which runs on the second lane and is located behind the vehicle V that runs on the first lane, based on the input information, for example. Besides, the overtaking time calculator 43 calculates the overtaking time tp for the following vehicle to overtake the vehicle V and the shift start timing ts, based on the computed relative speed and relative distance between the following vehicle and the vehicle V and outputs the overtaking time and the shift start timing to the target gear ratio calculator 45.

For example, to the accelerating gear ratio calculator 44, the setting speed $v_{set}$ of the vehicle V set by the driver of the vehicle V is input from the gear ratio control unit 10, the speed v of the vehicle V is input from the detector S, and the gear ratio $R_t$ of the vehicle V is input from the setting value storage SD. The accelerating gear ratio calculator 44 calculates the accelerating gear ratio $R_t a$ for accelerating the vehicle V, based on the input information, and outputs the accelerating gear ratio to the overtaking time calculator 43 and the target gear ratio calculator 45.

To the target gear ratio calculator 45, the shift start timing ts is input from the overtaking time calculator 43, and the accelerating gear ratio $R_t a$ is input from the accelerating gear ratio calculator 44. The target gear ratio calculator calculates the target gear ratio $R_t t$ and outputs the target gear ratio to the gear ratio control unit 10. Incidentally, the target gear ratio calculator 45 may be configured to output the target gear ratio $R_t t$ to the gear ratio control unit 10, only when it is necessary to perform shifting in advance in order to accelerate the vehicle V.

For example, the steering angle signal $s_{ra}$ indicating the steering angle of the vehicle V and the signal $s_2$ indicating a lane on which the vehicle V runs are input to the steering angle calculator 47 from the detector S. The steering angle calculator 47 calculates a locational information of the vehicle V for determining a right-left location with respect to the traveling direction of the vehicle V, based on the input information, calculates the target steering angle signal $s_{ra}t$ for controlling the right-left location of the vehicle V, and outputs the target steering angle signal to the vehicle behavior control unit 50.

In addition, the driver-assistance unit 40 may recognize the lane on which the vehicle V runs, as the first lane, by the overtaking time calculator 43 or the lane change recognizer 46, for example, and may determine whether or not there is a second lane for the vehicle V to overtake the preceding vehicle. Incidentally, whether or not there is a second lane for the vehicle V to overtake the preceding vehicle may be determined based on map information of a navigation system such as a global navigation satellite system (GNSS) which configures the detector S or may be determined based on an image of a camera which configures the detector S.

That is, a method for determining whether or not there is a second lane for overtaking the preceding vehicle is not particularly limited.

For example, the target braking torque $T_b t$ and the target steering angle signal $s_{ra} t$ are input to the vehicle behavior control unit 50 from the driver-assistance unit 40. The vehicle behavior control unit 50 controls a brake Br based on the target braking torque $T_b t$ to brake the vehicle V and controls the power steering device PS based on the target steering angle signal $s_{ra} t$ to steer the vehicle V.

For example, the target engine torque $T_e t$ is input to the engine control unit 60 from the driver-assistance unit 40. For example, the engine control unit 60 is configured to control the rotational speed $N_e$ and torque $T_e$ of the engine E of the vehicle V based on the input target engine torque $T_e t$. The engine control unit 60 may control the rotational speed $N_e$ of the engine E (refer to FIG. 4) to be equal to or lower than the preset setting rotational speed, until the determination unit 20 switches the determination that there is an acceleration limit to the determination that there is no acceleration limit, and the gear ratio control unit 10 increases the gear ratio $R_t$.

Next, an operation of the control device 100 for vehicles of the present embodiment will be described.

Figure 3:
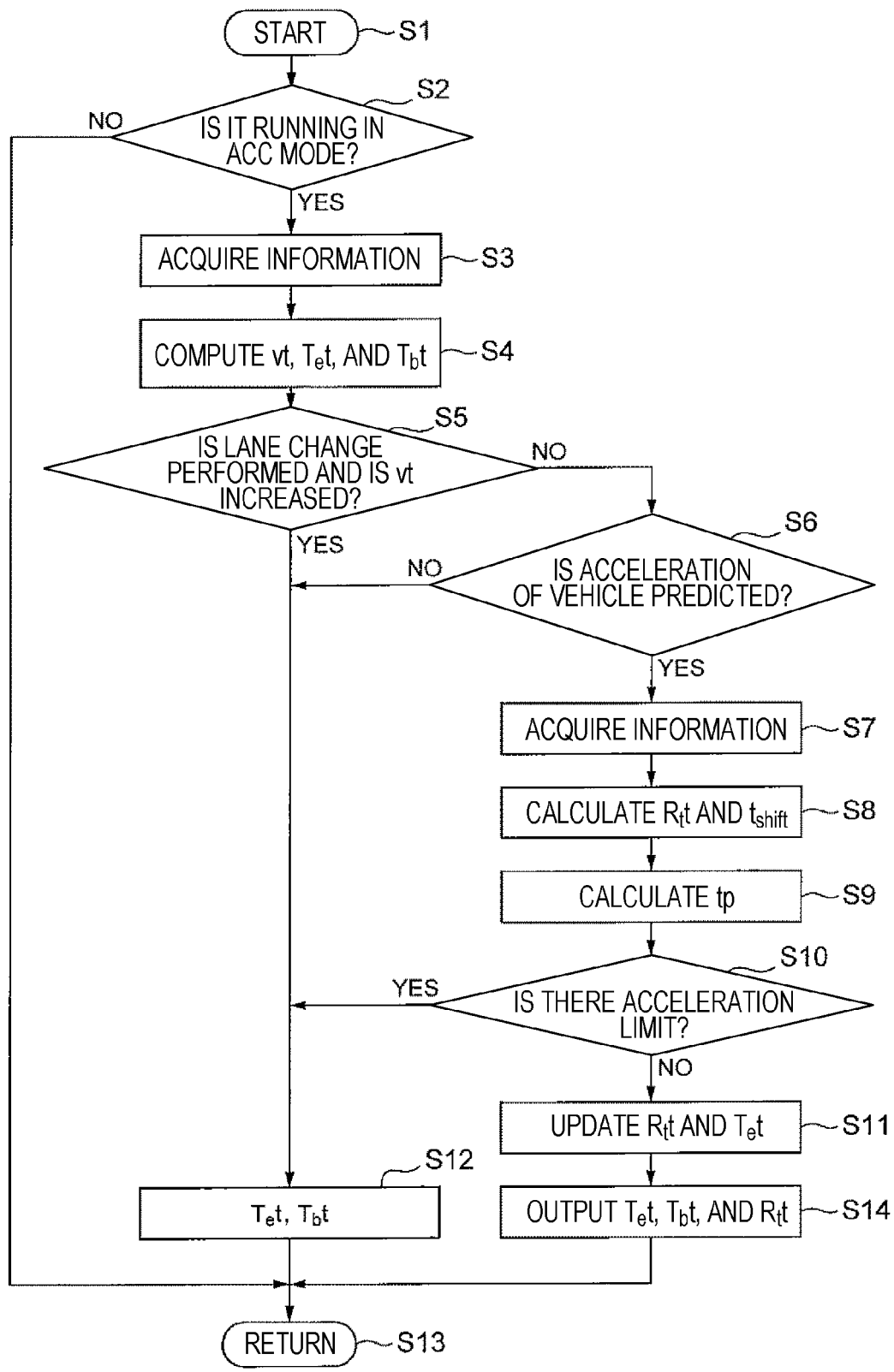
FIG. 3 is a flowchart illustrating an example of an operation of the control device for vehicles illustrated in FIG. 1.

FIG. 3 is a flowchart illustrating an example of the operation of the control device 100 for vehicles illustrated in FIG. 1. In Step S1, the control device 100 for vehicles starts controlling. Then, in Step S2, the driver-assistance unit 40 determines whether or not the vehicle V runs in an ACC mode. Specifically, the driver-assistance unit 40 acquires information of whether or not there is setting of the ACC, from the setting value storage SD, for example. When the vehicle V runs in the ACC mode (Yes), a controlling process proceeds to Step S3. On the other hand, when the vehicle V does not run in the ACC mode (No), the controlling process proceeds to Step S13 and returns to Step S1.

In Step S3, the driver-assistance unit 40 acquires the inter-vehicular distance $d_{fv}$ between the preceding vehicle and the vehicle V, the relative speed between the preceding vehicle and the vehicle V, and the speed v of the vehicle V from the detector S and acquires the setting speed $v_{set}$ of the vehicle V from the setting value storage SD, for example. In addition, the driver-assistance unit 40 causes the lane change recognizer 46 to acquire the steering angle signal $s_{ra}$ and the signal $s_2$ indicating the lane on which the vehicle V runs, from the detector S, and outputs the signal $s_1$ indicating whether or not the vehicle V is in the middle of performing the lane change to the target speed calculator 41, for example.

Next, in Step S4, the driver-assistance unit 40 causes the target speed calculator 41 to calculate the target speed vt of the vehicle V and causes the braking power calculator 42 to compute the target engine torque $T_e t$ and the target braking torque $T_b t$, for example.

For example, the target speed vt of the vehicle V can be calculated as follows. When the preceding vehicle is not present ahead of the vehicle V, the setting speed $v_{set}$ set by the driver of the vehicle V is determined as the target speed vt. When the preceding vehicle is present ahead of the vehicle V, a speed $v_a$ for enabling the inter-vehicular distance $d_{fv}$ between the vehicle V and the preceding vehicle to fall within the setting distance $d_{set}$ set by the driver of the vehicle V is calculated, and a lower speed of the calculated speed $v_a$ and the setting speed $v_{set}$ is determined as the target speed vt.

For example, the speed $v_a$ of the vehicle V for enabling the inter-vehicular distance $d_{fv}$ between the vehicle V and the preceding vehicle to fall within the setting distance $d_{set}$ can be calculated as follows. Examples of input information are the speed v of the vehicle V and the setting distance $d_{set}$ set by the driver of the vehicle V. For example, the setting distance $d_{set}$ has three levels of a short distance, a medium distance, and a long distance. Regarding two items of input information of the speed v and the setting distance $d_{set}$, for example, an experiment is carried out in advance to make a map on which information of the inter-vehicular distance is output.

Consequently, the speed v of the vehicle V and the setting distance $d_{set}$ are input, and thereby information of an inter-vehicular distance $d_a$ is output from the map. Next, feedback control is performed depending on a deviation between information of the inter-vehicular distance $d_a$ output from the map and the inter-vehicular distance $d_{fv}$ between the preceding vehicle and the vehicle V. An output value of the feedback control is determined as the speed $v_a$ of the vehicle V for enabling the inter-vehicular distance $d_{fv}$ between the vehicle V and the preceding vehicle to fall within the setting distance $d_{set}$.

For example, the target engine torque $T_e t$ can be calculated as follows. First, feedback control is performed depending on a deviation between the target speed vt and an actual speed v of the vehicle V, and an output value thereof is determined as a target driving force Ft. Besides, the target engine torque $T_e t$ is computed from the following Expression (1), using the target driving force Ft, the gear ratio $R_t$ of the vehicle V, a gear ratio $R_d$ of the differential device Df, a radius $r_W$ of the tire W, and running resistance fr of the vehicle V.

[Expression 1]

$$T_e t = \frac{r_w (Ft - f_r)}{R_t \cdot R_d} \qquad (1)$$

Incidentally, the running resistance fr of the vehicle V can be estimated from the speed v of the vehicle V. In addition, the above-described Expression (1) is a simple computing method representing an example of a method for computing the target engine torque $T_e t$, and the target engine torque $T_e t$ may be computed from more detailed calculation.

For example, the target braking torque $T_b t$ can be calculated as follows. When the target speed vt of the vehicle V decreases, the target braking torque $T_b t$ for decelerating the vehicle V is computed. In this case, the target driving force Ft becomes a negative value, and the value is determined as the target braking torque $T_b t$. Incidentally, the target braking torque $T_b t$ can be set as a value obtained by reflecting a braking force of the engine E due to a decrease in the target engine torque $T_e t$.

Next, in Step S5, the control device 100 for vehicles causes the driver-assistance unit 40 to determine whether or not there is a lane change of the vehicle V and whether or not the target speed vt increases. Incidentally, the lane change of the vehicle V may be performed by manipulation of the steering wheel SW and the accelerator pedal performed by the driver of the vehicle V or may be automatically performed by the driver-assistance unit 40. For example, as described above, the lane change recognizer 46 of the driver-assistance unit 40 can recognize whether or not there is a lane change of the vehicle V, based on the steering angle signal $s_{ra}$ indicating a steering angle of the vehicle V and the signal $s_2$ indicating the lane on which the vehicle V runs.

In Step S5, for example, when the driver-assistance unit 40 determines that the lane change of the vehicle V is performed and that the target speed vt is increased (Yes), the process proceeds to Step S12. In Step S12, the target engine torque $T_e t$ and the target braking torque $T_b t$ computed in Step S4 are output to the engine control unit 60 and the vehicle behavior control unit 50, and the process proceeds to Step S13 and returns to Step S1. On the other hand, in Step S5, for example, when the driver-assistance unit 40 determines that the lane change of the vehicle V is not performed or that the target speed vt is not increased (No), the process proceeds to Step S6.

In Step S6, whether or not the acceleration of the vehicle V is predicted is determined. Specifically, the prediction unit 30 acquires the signal $s_3$ including information of lanes on which the vehicle V and the following vehicle run, the signal $s_4$ including information of the speed v of the following vehicle and the inter-vehicular distance $d_{fv}$ between the vehicle V and the following vehicle, and the signal $s_5$ including manipulation information of the turn signal, via the driver-assistance unit 40, for example. When the turn signal is manipulated, and there is a lane on which the vehicle V can overtake the preceding vehicle, the prediction unit 30 predicts the lane change of the vehicle V, thereby, predicting acceleration of the vehicle V.

In addition, in Step S6, when the inter-vehicular distance $d_{fv}$ between the vehicle V and the preceding vehicle which runs ahead of the vehicle V is equal to or shorter than the preset setting distance $d_{set}$, or when the speed v of the vehicle V is equal to or lower than the preset setting speed $v_{set}$, the prediction unit 30 may predict the lane change of the vehicle V, thereby, predicting acceleration of the vehicle V. In Step S6, when the prediction unit 30 predicts the acceleration of the vehicle V (Yes), the process proceeds to Step S7. When the prediction unit 30 does not predict the acceleration of the vehicle V (No), the process returns to Step S1 through Step S12 and Step S13.

In Step S7, the driver-assistance unit 40 acquires information necessary to calculate the target gear ratio $R_t t$. Specifically, the accelerating gear ratio calculator 44 acquires the speed v, the setting speed $v_{set}$, the gear ratio $R_t$ of the vehicle V, the overtaking time calculator 43 acquires information of the speed $v_{fv}$ of the following vehicle and the inter-vehicular distance $d_{fv}$ between the vehicle V and the following vehicle, and the process proceeds to Step S8.

In Step S8, the target gear ratio $R_t t$ and a shifting time $t_{shift}$ are computed based on the information acquired in Step S7. Specifically, the accelerating gear ratio calculator 44 computes the accelerating gear ratio $R_t a$, and the overtaking time calculator 43 computes the shift start timing ts. Further, the accelerating gear ratio $R_t a$ and the shift start timing ts are input to the target gear ratio calculator 45, and the target gear ratio calculator 45 computes the target gear ratio $R_t t$ and the shifting time $t_{shift}$.

For example, the target gear ratio $R_t t$ and the shifting time $t_{shift}$ can be computed as follows. First, target acceleration at of the vehicle V is computed from the speed v and the setting speed $v_{set}$ of the vehicle V. Besides, the target gear ratio $R_t t$ is computed from the target acceleration at and the speed v of the vehicle V. In addition, the shifting time $t_{shift}$ is computed from the target gear ratio $R_t t$ and the current gear ratio $R_t$ of the vehicle V.

More specifically, an acceleration map can be made corresponding to inputting of the speed v and the setting speed $v_{set}$ of the vehicle V based on the experiment in advance, for example, and the target acceleration at can be derived based on the acceleration map and the speed v and the setting speed $v_{set}$ of the vehicle V, for example. In addition, a gear ratio map can be made corresponding to the speed v and the target acceleration at of the vehicle V based on the experiment in advance, for example, and the target gear ratio $R_t t$ at can be derived based on the gear ratio map and the speed v and the target acceleration at of the vehicle V, for example.

To be more particular, the shifting time $t_{shift}$ can be computed as follows. A threshold $t_{th}$ of the shifting time $t_{shift}$ is obtained based on the current gear ratio $R_t$ and the target gear ratio $R_t t$ of the vehicle V. The threshold $t_{th}$ is a limit value of the shift speed. Besides, the shifting time $t_{shift}$ is computed based on the following Expression (2) by using the threshold $t_{th}$, and the current gear ratio $R_t$ and the target gear ratio $R_t t$ of the vehicle V.

[Expression 2]

$$t_{shift} = \frac{R_t t - R_t}{t_{th}} \qquad (2)$$

Next, in Step S9, the driver-assistance unit 40 causes the overtaking time calculator 43 to acquire the speed v of the vehicle V, the speed $v_{fv}$ of the following vehicle, the inter-vehicular distance $d_{fv}$ between the following vehicle and the vehicle V, the total length L of the vehicle V, and the total length $L_{fv}$ of the following vehicle, from the detector S and the setting value storage SD, for example. Incidentally, the total length $L_{fv}$ of the following vehicle can be determined by referring to a numerical value of a full-length table for each vehicle model which is stored in the setting value storage SD, based on detection of a vehicle model of the following vehicle by the detector S, or can be determined to use a value of constant stored in the setting value storage SD, for example. The overtaking time calculator 43 computes the overtaking time tp for the following vehicle to overtake the vehicle V, based on the acquired information, and based on the following Expression (3), for example.

[Expression 3]

$$tp = \frac{d_{fv} + L + L_{fv}}{v_{fv} - v} \qquad (3)$$

Next, in Step S10, the determination unit 20 determines whether or not there is an acceleration limit of the vehicle V.

When the determination unit 20 determines that there is an acceleration limit (Yes), the gear ratio control unit 10 limits an increase in gear ratio $R_t$ of the vehicle V, and the process proceeds to Step S12. In Step S12, the target engine torque $T_e t$ and the target braking torque $T_b t$ computed in Step S4 are output to the engine control unit 60 and the vehicle behavior control unit 50, and the process returns to Step S1 through Step S13.

Figure 4:
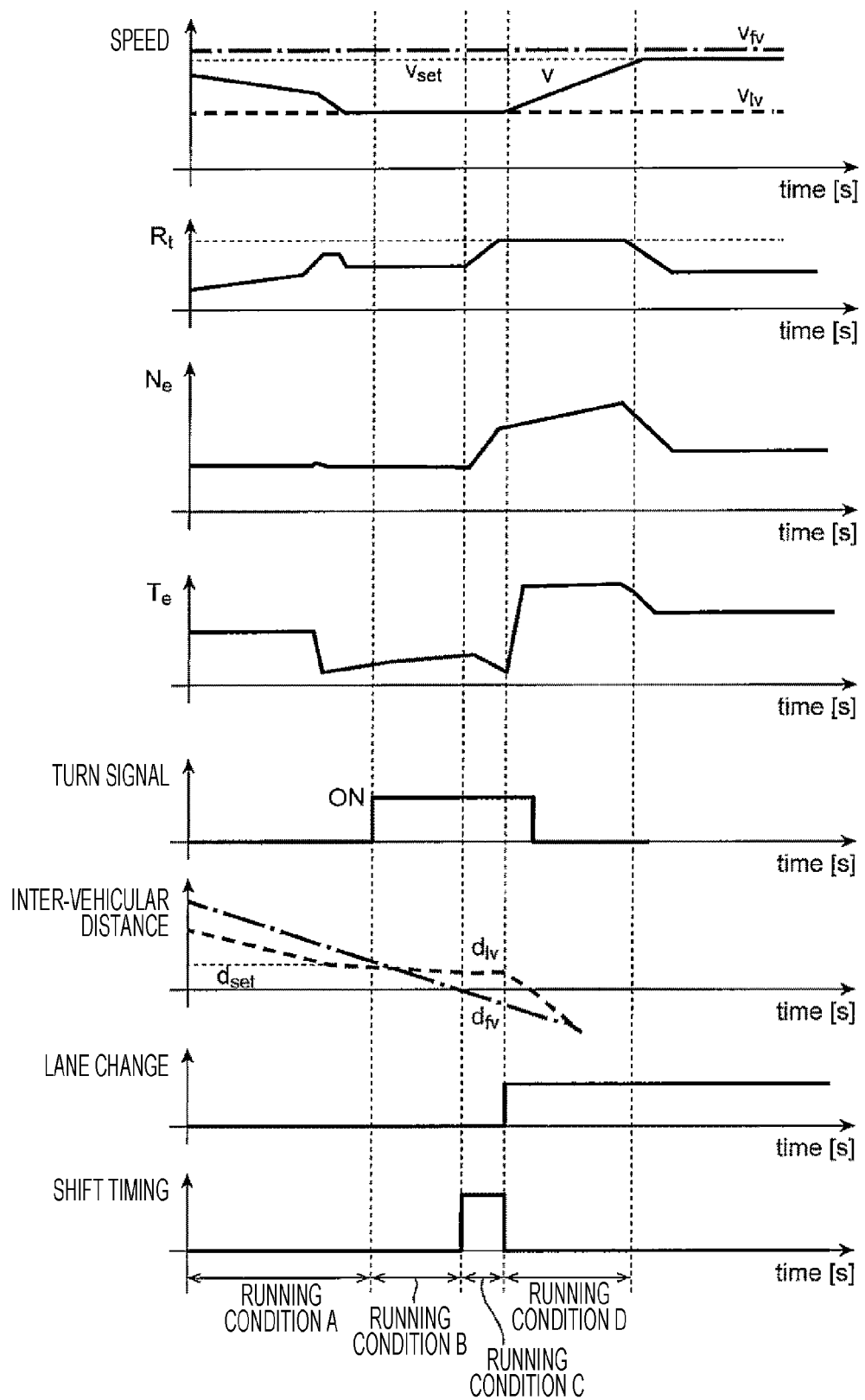
FIG. 4 is a time chart illustrating a state of a vehicle on which the control device for vehicles illustrated in FIG. 1 is mounted.

FIG. 4 is a time chart illustrating a state of the vehicle V on which the control device 100 for vehicles illustrated in FIG. 1 is mounted. In FIG. 4, the horizontal axes of a plurality of graphs arranged from top to bottom all represent time. In addition, the vertical axes of the graphs represent, from top to bottom, a speed, a gear ratio $R_t$, a rotational speed $N_e$ of the engine E, torque $T_e$ of the engine E, manipulation of the turn signal, an inter-vehicular distance between the vehicle V and the preceding vehicle and the following vehicle, a lane change of the vehicle V, and a shift timing of the vehicle V.

On the graphs illustrated in FIG. 4, the time represented by the horizontal axes is divided into several zones to be described. Specifically, a period in which the vehicle V runs in a normal ACC mode is set as a running condition A, a period in which the turn signal is turned on and the vehicle runs in the ACC mode is set as a running condition B, a period in which the gear ratio $R_t$ is controlled is set as a running condition C, and a period in which the acceleration is performed is set as a running condition D.

On a graph of the speed at the top in FIG. 4, the speed v of the vehicle V is represented by a solid line, the speed $v_{lv}$ of the preceding vehicle is represented by a dashed line, and the speed $v_{fv}$ of the following vehicle is represented by a dot-and-dash line. In addition, in the third graph of the inter-vehicular distance from the bottom in FIG. 4, the inter-vehicular distance $d_{lv}$ between the preceding vehicle and the vehicle V is represented by a dashed line, and the inter-vehicular distance $d_{fv}$ between the following vehicle and the vehicle V is represented by a dot-and-dash line.

In the running condition A illustrated in FIG. 4, the preceding vehicle runs ahead of the vehicle V at the speed $v_{lv}$ lower than the setting speed $v_{set}$ of the vehicle V, and the following vehicle runs behind the vehicle V at the speed $v_{fv}$ higher than the setting speed $v_{set}$ of the vehicle V. In the running condition A, the control performed by the control device 100 for vehicles is started in Step S1 illustrated in FIG. 3, determination that the vehicle runs in the ACC mode (Yes) is carried out in Step S2, and various types of information are acquired from the detector S and the setting value storage SD in Step S3.

Further, in the running condition A, the target engine torque $T_e t$ and the target braking torque $T_b t$ are computed in Step S4, and determination that the lane change of the vehicle V is not performed (No) is carried out in Step S5. In addition, since the turn signal is not manipulated from the opening stage to the final stage of the running condition A, the acceleration of the vehicle V is not expected in Step S6 (No), and the process proceeds to Step S12. Consequently, the target engine torque $T_e t$ and the target braking torque $T_b t$ computed in Step S4 is output, the vehicle behavior control unit 50 controls the brake Br, the engine control unit 60 controls the engine E, and the gear ratio control unit 10 controls the shifter T.

In addition, from the opening stage to the final stage of the running condition A, Steps S1 to S6 and Steps S12 and S13 are repeated at a predetermined cycle. Consequently, the control device 100 for vehicles controls the speed v of the vehicle V such that the inter-vehicular distance $d_{lv}$ between the preceding vehicle and the vehicle V converges to the setting distance $d_{set}$ which is a preset inter-vehicular distance. As a result, the speed v of the vehicle V gradually decreases, as the inter-vehicular distance $d_{lv}$ between the preceding vehicle and the vehicle V illustrated as the graph of the inter-vehicular distance in FIG. 4 becomes shorter. In addition, the gear ratio $R_t$ of the vehicle V increases as the speed v of the vehicle V decreases such that the rotational speed $N_e$ and the torque $T_e$ of the engine E are constant.

When the inter-vehicular distance $d_{lv}$ between the preceding vehicle and the vehicle V becomes the setting distance $d_{set}$ in the final stage of the running condition A, the speed v of the vehicle V is further decreased to be the same as the speed $v_{lv}$ of the preceding vehicle, and the vehicle V maintains the setting distance $d_{set}$ to follow the preceding vehicle. In addition, the gear ratio $R_t$ of the vehicle V increases during the deceleration of the vehicle V and becomes constant when the vehicle V shifts to constant speed running. In addition, the torque $T_e$ of the engine E decreases, as the vehicle V decelerates and the gear ratio $R_t$ increases. Besides, at the end of the running condition A, the turn signal is turned on, and transition to the running condition B is performed.

Since the turn signal is manipulated to be turned ON, and a lane on which the vehicle can overtake the preceding vehicle is recognized in the running condition B, the acceleration of the vehicle V is expected in Step S6 (Yes), and the process proceeds to Step S7. Besides, information necessary for the calculation of the target gear ratio $R_t t$ is acquired in Step S7, the target gear ratio $R_t t$ and the shifting time $t_{shift}$ are computed in Step S8, and the overtaking time tp is computed in Step S9. Besides, in Step S10, the determination unit 20 determines whether or not there is an acceleration limit of the vehicle V.

In Step S10, the determination unit 20 determines that there is an acceleration limit, when the inter-vehicular distance $d_{fv}$ between the vehicle V and the following vehicle that runs behind the vehicle V is equal to or shorter than the preset setting distance, for example. In addition, the determination unit 20 determines that there is an acceleration limit, when the relative speed $(v_{fv}-v)$ between the vehicle V and the following vehicle that runs behind the vehicle V is equal to or higher than the preset setting speed, for example.

Further, in Step S10, the determination unit 20 may determine whether or not there is an acceleration limit, as follows. First, the shift start timing ts is computed by the following Expression (4) from the overtaking time tp and the shifting time $t_{shift}$, and determination of whether or not the shift start timing satisfies the following Inequality (5).

[Expression 4]

$$ts = tp - t_{shift} \quad (4)$$

[Inequality 5]

$$ts_{low} \leq ts \leq ts_{high} \quad (5)$$

Here, in Inequality (5), a threshold $ts_{low}$ of the lower limit of the shift start timing ts is a constant threshold for determining a case where the following vehicle is in the middle of overtaking the vehicle V or a case where the following vehicle is not present. In addition, a threshold $ts_{high}$ on an upper limit side of the shift start timing ts is a constant threshold for determining a case where a time is taken for the vehicle V to overtake the following vehicle such as a case where the inter-vehicular distance $d_{fv}$ between the vehicle V and the following vehicle is sufficiently long or a case where the relative speed $(v_{fv}-v)$ between the vehicle V and the following vehicle is sufficiently slow. The threshold $ts_{low}$ and the threshold $ts_{high}$ can be determined as an appropriate value based on an experiment, for example.

In Step S10, when the shift start timing ts satisfies the above-described Inequality (5), the determination unit 20 determines that there is an acceleration limit (Yes), and the process proceeds to Step S12 and returns to Step S1 through Step S13. On the other hand, in Step S10, when the shift start timing ts does not satisfy the above-described inequality (5), the determination unit 20 determines that there is no acceleration limit (No), and the process proceeds to Step S11.

For example, as described above, in the running condition B illustrated in FIG. 4, the determination unit 20 determines that there is an acceleration limit (Yes) in Step S10, based on the inter-vehicular distance $d_{fv}$ between the following vehicle and the vehicle V, the relative speed between the following vehicle and the vehicle V, the overtaking time tp for the following vehicle to overtake the vehicle V, or the above-described Inequality (5), and the process proceeds to Step S12. In Step S12, the target engine torque $T_e t$ and the target braking torque $T_b t$ computed in Step S4 are output to the engine control unit 60 and the vehicle behavior control unit 50, and the process proceeds to Step S13 and returns to Step S1. In addition, from the opening stage to the final stage of the running condition B, Steps S1 to S10 and Steps S12 and S13 are repeated at a predetermined cycle.

In this manner, the control device 100 for vehicles can cause the determination unit 20 to determine whether or not there is an acceleration limit of the vehicle V such as a limit of acceleration due to presence of the following vehicle that is about to overtake the vehicle V, for example. Besides, when there is an acceleration limit, the gear ratio control unit 10 can limit an increase in the gear ratio $R_t$. Hence, until there is no acceleration limit, it is possible to limit the increase in the gear ratio $R_t$, it is possible to prevent the rotational speed $N_e$ of the engine E from increasing uselessly, and it is possible to improve quietness and fuel economy of the vehicle V.

Then, in the running condition B, the inter-vehicular distance $d_{fv}$ between the vehicle V and the preceding vehicle is maintained to fall within the setting distance $d_{set}$ such that the vehicle V follows the preceding vehicle at a constant speed. When the inter-vehicular distance $d_{fv}$ between the following vehicle and the vehicle V becomes 0 or approaches 0, the determination unit 20 determines that there is no acceleration limit (No) in Step S10 illustrated in FIG. 3, for example, as described above, based on the inter-vehicular distance $d_{fv}$ between the following vehicle and the vehicle V, the overtaking time tp for the following vehicle to overtake the vehicle V, or the above-described Inequality (5), and the process proceeds to Step S11.

In Step S11, the target gear ratio $R_t t$ and the target engine torque $T_e t$ computed in Step S8 are updated, and the process proceeds to Step S14. The target engine torque $T_e t$ updated in Step S11 is the target engine torque $T_e t$ obtained by also reflecting an amount in response to a shift instruction due to the target gear ratio $R_t t$. Specifically, when the target gear ratio $R_t t$ is instructed, the gear ratio $R_t$ to the next control cycle is expected, and the target engine torque $T_e t$ computed from the above-described Expression (1) using the expected gear ratio $R_t$ is obtained.

In Step S14, the target gear ratio $R_t t$, the target engine torque $T_e t$, and the target braking torque $T_b t$ updated in Step S11 are output from the driver-assistance unit 40. The target gear ratio $R_t t$ output from the driver-assistance unit 40 is input to the gear ratio control unit 10, and the gear ratio $R_t$ of the vehicle V is increased via the shifter T, for example.

Consequently, in the running condition C illustrated in FIG. 4, before the following vehicle completely overtakes the vehicle V and reaches a predetermined location ahead of the vehicle V, for example, the gear ratio $R_t$ of the vehicle V starts increasing. Consequently, it is possible to maintain the high responsiveness to the acceleration of the vehicle V. At that time, the engine E is controlled by the engine control unit 60 based on the updated target engine torque $T_e t$ in Step S11, and thus the torque $T_e$ of the engine decreases by an amount of an increase in the gear ratio $R_t$.

At that time, the vehicle V still follows in a state where the setting distance $d_{set}$ is maintained to the preceding vehicle that runs at the speed $v_{fv}$ lower than the setting speed $v_{set}$ of the vehicle V. Then, when the following vehicle completely overtakes the vehicle V, and the vehicle V performs the lane change to start overtaking the preceding vehicle, the target speed vt of the vehicle V which is computed by the target speed calculator 41 of the driver-assistance unit 40 increases. At that time, since the gear ratio $R_t$ has been already shifted to the target gear ratio $R_t t$, it is possible to secure the high responsiveness to the acceleration of the vehicle V.

Incidentally, the lane change of the vehicle V may be performed by manipulating the steering wheel SW and the accelerator pedal by the driver of the vehicle V or may be performed by causing the driver-assistance unit 40 to control the power steering device PS and the engine E via the vehicle behavior control unit 50 and the engine control unit 60.

As described above, the control device 100 for vehicles according to the embodiment is a device that is mounted on the vehicle V and includes the gear ratio control unit 10 that controls the gear ratio $R_t$ of the vehicle V and the determination unit 20 that determines whether or not there is an acceleration limit of the vehicle V. The gear ratio control unit 10 is configured to limit an increase in gear ratio $R_t$, when the determination unit 20 determines that there is an acceleration limit.

According to the configuration, for example, when the acceleration of the vehicle V is predicted and there is an acceleration limit that is a factor of limiting the acceleration of the vehicle V, the determination unit 20 can determine that there is an acceleration limit, and the gear ratio control unit 10 can limit an increase in the gear ratio $R_t$. In addition, when the acceleration limit of the vehicle V disappears, and the determination unit 20 determines that there is no acceleration limit, the gear ratio control unit 10 can immediately increase the gear ratio $R_t$. Hence, according to the control device 100 for vehicles of the present embodiment, while the high responsiveness to the acceleration of the vehicle V is maintained, the rotational speed $N_e$ of the engine E can be prevented from unnecessarily increasing, and the quietness and the fuel economy of the vehicle V can be improved.

In addition, as described above, the control device 100 for vehicles of the present embodiment includes the prediction unit 30 that predicts the acceleration of the vehicle V. Besides, the gear ratio control unit 10 is configured to increase the gear ratio $R_t$ of the vehicle V, when the prediction unit 30 predicts the acceleration of the vehicle V, and the determination unit 20 determines that there is no acceleration limit.

According to the configuration, the prediction unit 30 can predict the acceleration of the vehicle V, and thus the gear ratio control unit 10 can start increasing the gear ratio $R_t$ by reflecting the shifting time $t_{shift}$ for shifting the gear ratio $R_t$ of the vehicle to the target gear ratio $R_t t$ or the overtaking time tp for the following vehicle to overtake the vehicle V. Hence, it is possible to secure the high responsiveness to the acceleration of the vehicle V.

In addition, in the control device 100 for vehicles of the present embodiment, for example, the prediction unit 30 is configured to predict the acceleration of the vehicle V, when predicting the lane change of the vehicle V.

According to the configuration, for example, the vehicle V can catch up the preceding vehicle which runs ahead of the vehicle V at a lower speed than that of the vehicle V, and it is possible to predict the acceleration of the vehicle V, in a case where the turn signal of the vehicle V is manipulated or the like. Consequently, before the vehicle V actually starts accelerating, it is possible to increase the gear ratio $R_t$ in advance, to secure the high responsiveness to the acceleration of the vehicle V, and to overtake the preceding vehicle quickly and smoothly.

In addition, in the control device 100 for vehicles of the present embodiment, for example, the prediction unit 30 is configured to predict the lane change of the vehicle V, when the inter-vehicular distance $d_{lv}$ between the vehicle V and the preceding vehicle which runs ahead of the vehicle V is equal to or shorter than the preset setting distance $d_{set}$.

According to the configuration, for example, when the vehicle V catches up the preceding vehicle which runs ahead of the vehicle V at a lower speed than that of the vehicle V, and the inter-vehicular distance $d_{lv}$ between the preceding vehicle and the vehicle V is equal to or shorter than the preset setting distance $d_{set}$, the prediction unit 30 of the control device 100 for vehicles can predict the lane change and the acceleration of the vehicle V quickly. Consequently, it is possible to accurately predict the acceleration of the vehicle V, to secure the high responsiveness to the acceleration of the vehicle V, and to overtake the preceding vehicle quickly and smoothly.

In addition, in the control device 100 for vehicles, the prediction unit 30 is configured to predict the lane change, when the speed v of the vehicle V is equal to or lower than the preset setting speed $v_{set}$.

According to the configuration, for example, the prediction unit 30 predict the lane change and acceleration of the vehicle V, that is, overtaking of the preceding vehicle, when the speed v of the vehicle V is equal to or lower than the setting speed $v_{set}$. Consequently, it is possible to predict the acceleration of the vehicle V accurately and quickly. In addition, the prediction unit 30 can predict the lane change and the acceleration of the vehicle V, that is, the overtaking of the preceding vehicle, when the speed v of the vehicle V is equal to or lower than the setting speed $v_{set}$, and the inter-vehicular distance $d_{lv}$ between the preceding vehicle and the vehicle V is equal to or shorter than the setting distance $d_{set}$, for example. Consequently, it is possible to predict the acceleration of the vehicle V accurately and quickly. Hence, it is possible to overtake the preceding vehicle quickly and smoothly; and besides, it is possible to prevent the rotational speed $N_e$ of the engine E from unnecessarily increasing, and to improve the quietness and the fuel economy of the vehicle V.

In addition, the control device 100 for vehicles of the present embodiment includes the driver-assistance unit 40 that causes the vehicle V to follow the preceding vehicle. Besides, the driver-assistance unit 40 is configured to perform the lane change of the vehicle V, when the determination unit 20 determines that there is no acceleration limit and the prediction unit 30 predicts the lane change.

According to the configuration, for example, when the vehicle V which runs in the ACC mode catches up the preceding vehicle that runs ahead of the vehicle V at a lower speed than that of the vehicle V, the driver-assistance unit 40 does not perform the lane change, and also the gear ratio $R_t$ does not increase, when there is an acceleration limit even when the prediction unit 30 predicts the acceleration. Hence, it is possible to prevent the rotational speed $N_e$ of the engine E from unnecessarily increasing and to improve the quietness and the fuel economy of the vehicle V. Then, when there is no acceleration limit, the gear ratio control unit 10 can increase the gear ratio $R_t$, and the driver-assistance unit 40 can perform the lane change and the acceleration of the vehicle V which runs in the ACC mode and can cause the vehicle V to overtake the preceding vehicle quickly and smoothly.

In addition, in the control device 100 for vehicles of the present embodiment, for example, the determination unit 20 is configured to determine that there is an acceleration limit, when the inter-vehicular distance $d_{fv}$ between the vehicle V and the following vehicle that runs behind the vehicle V is equal to or shorter than the preset setting distance, for example.

According to the configuration, for example, when the vehicle V catches up the preceding vehicle that runs ahead of the vehicle V at a lower speed than that of the vehicle V, and the inter-vehicular distance $d_{fv}$ between the vehicle V and the following vehicle is equal to or shorter than the setting distance, the determination unit 20 determines that there is an acceleration limit, and the gear ratio control unit 10 limits the increase in the gear ratio $R_t$. Hence, it is possible to avoid a risk such as an abnormal approach between the vehicle V and the following vehicle that tries to overtake the vehicle V; and besides, it is possible to prevent the rotational speed $N_e$ of the engine E from unnecessarily increasing in a state where the acceleration is limited and to improve the quietness and the fuel economy of the vehicle V.

In addition, in the control device 100 for vehicles of the present embodiment, the determination unit 20 is configured to determine that there is an acceleration limit, when the relative speed between the vehicle V and the following vehicle that runs behind the vehicle V is equal to or higher than the preset setting speed, for example.

According to the configuration, for example, when the vehicle V catches up the preceding vehicle that runs ahead of the vehicle V at a lower speed than that of the vehicle V, and the relative speed between the following vehicle and the vehicle V is equal to or higher than the preset setting speed, the determination unit 20 determines that there is an acceleration limit, and the gear ratio control unit 10 limits the increase in the gear ratio $R_t$. Hence, it is possible to avoid a risk such as an abnormal approach between the vehicle V and the following vehicle that tries to overtake the vehicle V; and besides, it is possible to prevent the rotational speed $N_e$ of the engine E from unnecessarily increasing in a state where the acceleration is limited and to improve the quietness and the fuel economy of the vehicle V.

In addition, in the control device 100 for vehicles of the present embodiment, for example, the determination unit 20 is configured to switch the determination that there is an acceleration limit to the determination that there is no acceleration limit, based on the overtaking time tp for the following vehicle to overtake the vehicle V.

According to the configuration, for example, when the vehicle V catches up the preceding vehicle that runs ahead of the vehicle V at a lower speed than that of the vehicle V, it is possible to estimate a time point when the following vehicle completes overtaking of the vehicle V, to perform back calculation from the time point, and to increase the gear ratio $R_t$ by the gear ratio control unit 10. Hence, it is possible to prevent the rotational speed $N_e$ of the engine E from unnecessarily increasing in the state where the acceleration is limited and to improve the quietness and the fuel economy of the vehicle V; and besides, it is possible to complete the increase of the gear ratio $R_t$ before the following vehicle completes the overtaking of the vehicle V, and to secure the high responsiveness to the acceleration of the vehicle V.

In addition, in the control device 100 for vehicles of the present embodiment, for example, the determination unit 20 may be configured to switch the determination that there is an acceleration limit to the determination that there is no acceleration limit, after the time point when the following vehicle overtakes the vehicle V.

According to the configuration, for example, to a time point when the vehicle V catches up the preceding vehicle that runs ahead of the vehicle V at a lower speed than that of the vehicle V, and the following vehicle completes the overtaking of the vehicle V, the gear ratio control unit 10 limits the increase in the gear ratio $R_t$. Hence, it is possible to more effectively prevent the rotational speed $N_e$ of the engine E from unnecessarily increasing in the state where the acceleration is limited and to further improve the quietness and the fuel economy of the vehicle V.

In addition, the control device 100 for vehicles of the present embodiment includes the engine control unit 60 that controls the rotational speed of the engine E of the vehicle V. Besides, the engine control unit 60 is configured to control the rotational speed of the engine E to be equal to or lower than the preset setting rotational speed, until the determination unit 20 switches the determination that there is an acceleration limit to the determination that there is no acceleration limit, and the gear ratio control unit 10 increases the gear ratio $R_t$. According to the configuration, it is possible to more effectively prevent the rotational speed $N_e$ of the engine E from unnecessarily increasing in the state where the acceleration is limited and to further improve the quietness and the fuel economy of the vehicle V.

In addition, in the embodiment, the vehicle V, on which the control device 100 for vehicles is mounted, includes the shifter T that can change the gear ratio $R_t$ of the vehicle V. Besides, the gear ratio control unit 10 of the control device 100 for vehicles is configured to control the gear ratio $R_t$ of the vehicle V via the shifter T. For example, the shifter T is a stepped transmission having a gear, a non-stage transmission having a belt, or a motor. According to the configuration, the control device 100 for vehicles enables the gear ratio control unit 10 to control the shifter T and can control the gear ratio $R_t$ of the vehicle V.

As described above, according to the embodiment of this disclosure, it is possible to provide the control device 100 for vehicles that can improve the quietness and the fuel economy, while maintaining the high responsiveness to the acceleration of the vehicle V.

As described above, the embodiment of this disclosure is described in detail with reference to the drawings; however, specific configurations are not limited to the embodiment. A design change and the like within a range without departing from the gist of this disclosure are included in this disclosure.

REFERENCE SIGNS LIST 10 gear ratio control unit
20 determination unit
30 prediction unit
40 driver-assistance unit
50 vehicle behavior control unit
60 engine control unit
100 control device for vehicle
$d_{fv}$ inter-vehicular distance between following vehicle and corresponding vehicle
$d_{lv}$ inter-vehicular distance between preceding vehicle and corresponding vehicle
$d_{set}$ setting distance
$R_t$ gear ratio
T shifter
v speed of vehicle
V vehicle
$v_{set}$ setting speed

The invention claimed is:

1. A control device for vehicles that is mounted on a vehicle,
the control device comprising:
a gear ratio control unit that controls a gear ratio of the vehicle;
a prediction unit that predicts acceleration of the vehicle; and
a determination unit that determines whether or not there is an acceleration limit of the vehicle,
wherein the gear ratio control unit limits an increase in the gear ratio, when the determination unit determines that there is an acceleration limit, and
wherein the gear ratio control unit increases the gear ratio, when the prediction unit predicts acceleration of the vehicle and the determination unit determines that there is no acceleration limit.

2. The control device for vehicles according to claim 1, wherein the prediction unit predicts acceleration of the vehicle, when predicting a lane change of the vehicle.

3. The control device for vehicles according to claim 2, wherein the prediction unit predicts the lane change, when an inter-vehicular distance between the vehicle and a preceding vehicle which runs ahead of the vehicle is equal to or shorter than a preset setting distance.

4. The control device for vehicles according to claim 2, wherein the prediction unit predicts the lane change, when a speed of the vehicle is equal to or lower than a preset setting speed.

5. The control device for vehicles according to claim 4, further comprising a driver-assistance unit that causes the vehicle to follow the preceding vehicle, wherein
the driver-assistance unit causes the vehicle to perform the lane change, when the determination unit determines that there is no acceleration limit and the prediction unit predicts the lane change.

6. The control device for vehicles according to claim 1, wherein the determination unit determines that there is an acceleration limit, when an inter-vehicular distance between the vehicle and a following vehicle which runs behind the vehicle is equal to or shorter than a preset setting distance.

7. The control device for vehicles according to claim 1, wherein the determination unit determines that there is an acceleration limit, when a relative speed between the vehicle and the following vehicle which runs behind the vehicle is equal to or higher than a preset setting speed.

8. The control device for vehicles according to claim 7, wherein the determination unit switches the determination that there is an acceleration limit to determination that there is no acceleration limit, based on a time for the following vehicle to overtake the vehicle.

9. The control device for vehicles according to claim 8, wherein the determination unit switches the determination that there is an acceleration limit to the determination that there is no acceleration limit, after a time point when the following vehicle overtakes the vehicle.

10. The control device for vehicles according to claim 1, wherein
the vehicle includes a shifter that is capable of changing the gear ratio, and
the gear ratio control unit controls the gear ratio via the shifter.

11. The control device for vehicles according to claim 10, wherein the shifter is a stepped transmission having a gear.

12. The control device for vehicles according to claim 10, wherein the shifter is a non-stage transmission having a belt.

13. The control device for vehicles according to claim 10, wherein the shifter is a motor.

14. A control device for vehicles that is mounted on a vehicle, the control device comprising:
- a gear ratio control unit that controls a gear ratio of the vehicle;
- a determination unit that determines whether or not there is an acceleration limit of the vehicle; and
- an engine control unit that controls a rotational speed of an engine of the vehicle,
- wherein the gear ratio control unit limits an increase in the gear ratio, when the determination unit determines that there is an acceleration limit, and
- wherein the engine control unit controls the rotational speed of the engine to be equal to or lower than a preset setting rotational speed, until the determination unit switches the determination that there is an acceleration limit to the determination that there is no acceleration limit, and the gear ratio control unit increases the gear ratio.

* * * * *